United States Patent [19]
Chan et al.

[11] Patent Number: 5,547,027
[45] Date of Patent: Aug. 20, 1996

[54] LOW TEMPERATURE, LOW RHEOLOGY SYNTHETIC CEMENT

[75] Inventors: Keng S. Chan, Missouri City; Thomas J. Griffin, Jr., Richmond, both of Tex.

[73] Assignee: Dowell, a division of Schlumberger Technology Corporation, Houston, Tex.

[21] Appl. No.: 449,640

[22] Filed: May 24, 1995

Related U.S. Application Data

[62] Division of Ser. No. 275,203, Jul. 14, 1994, abandoned.

[51] Int. Cl.$^6$ ..................................... E21B 33/14
[52] U.S. Cl. ........................................ 166/295; 166/300
[58] Field of Search ............................. 166/295, 300; 523/130

[56] References Cited

U.S. PATENT DOCUMENTS

| | | | |
|---|---|---|---|
| 2,294,294 | 8/1942 | Grebe | 166/295 |
| 3,176,768 | 4/1965 | Brandt et al. | 166/295 |
| 3,308,884 | 3/1967 | Robichaux | 166/295 |
| 3,316,966 | 5/1967 | Dear, Jr. | 166/295 |
| 3,416,604 | 12/1968 | Rensvold | 166/295 |
| 4,113,015 | 9/1978 | Meijs | 166/295 |
| 4,189,002 | 2/1980 | Martin | 166/295 |

*Primary Examiner*—George A. Suchfield
*Attorney, Agent, or Firm*—John E. Vick, Jr.

[57] ABSTRACT

A low-temperature, low-rheology synthetic cement comprises an epoxy resin, catalyst and hardener and further including an aromatic solvent have the formula

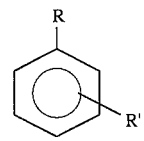

wherein R and R' are independently selected from hydrogen and C1 to C4 hydrocarbons.

2 Claims, 1 Drawing Sheet

LOW TEMPERATURE, LOW RHEOLOGY SYNTHETIC CEMENT

CROSS REFERENCE TO RELATED APPLICATIONS

This application is a division of previously filed application Ser. No. 08/275,203 filed Jul. 14, 1994, now abandoned.

This invention relates to the art of hydrocarbon production from a subterranean well and, more particularly, to a cement composition effective in sealing against the interzonal leakage of gas through minute passageways in the cement which locates a well casing within the well.

BACKGROUND OF THE INVENTION

Synthetic cements, particularly epoxy-type cements, have long been known for use in remedial or "squeeze" cementing applications wherein the synthetic cement is used to fill voids which may be present following the initial cementing of a well casing within a wellbore. In such a synthetic squeeze cementing operation, the synthetic cement penetrates into and seals off microannular fissures, and pore spaces in order to prevent interzonal transport of wellbore fluids, particularly gas, through the cement between the various fluid-containing intervals of the formations traversed by the wellbore.

Difficulty arises, however, when attempts are made to use this synthetic cement in a relatively cold temperature environments (lower than about 20° C.). At these temperatures, the viscosity of the fluid cement composition exceeds 300 cp, a viscosity which not only makes pumping difficult but is also nearly impossible to mix properly and, at the low feed rates necessary for remedial cementing applications, will not flow freely enough to seal in the minute spaces desired.

SUMMARY OF THE INVENTION

The present invention overcomes the problems of mixing and pumping an epoxy-type synthetic cement in low temperature, low feed rate environments.

In accordance with the invention, a synthetic epoxy cement for remedial well cementing includes up to about a one to one ratio by weight of the epoxy resin component of the cement to an aromatic solvent.

Further in accordance with the invention, the above aromatic solvent is selected from a group consisting of benzene and substituted benzenes having the formula:

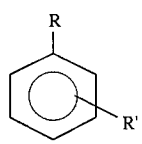

Wherein R and R' are independently hydrogen or a C1 to C4 hydrocarbon adduct.

Still further in accordance with the invention, the above synthetic epoxy cement further includes microsilica.

It is therefore an object of this invention to provide a remedial cement which has a viscosity which is both mixable and pumpable at a temperature of less than 20° C.

It is another object of this invention to provide a synthetic cement which will easily flow into and block minute passages at low temperatures.

BRIEF DESCRIPTION OF THE DRAWING

These and other objects are accomplished through the manner and form of the present invention to be described hereinafter in a more limited aspect of a preferred embodiment thereof and in conjunction with the accompanying drawing forming a part of this specification in which.

DETAILED DESCRIPTION OF A PREFERRED EMBODIMENT

Figure 1:
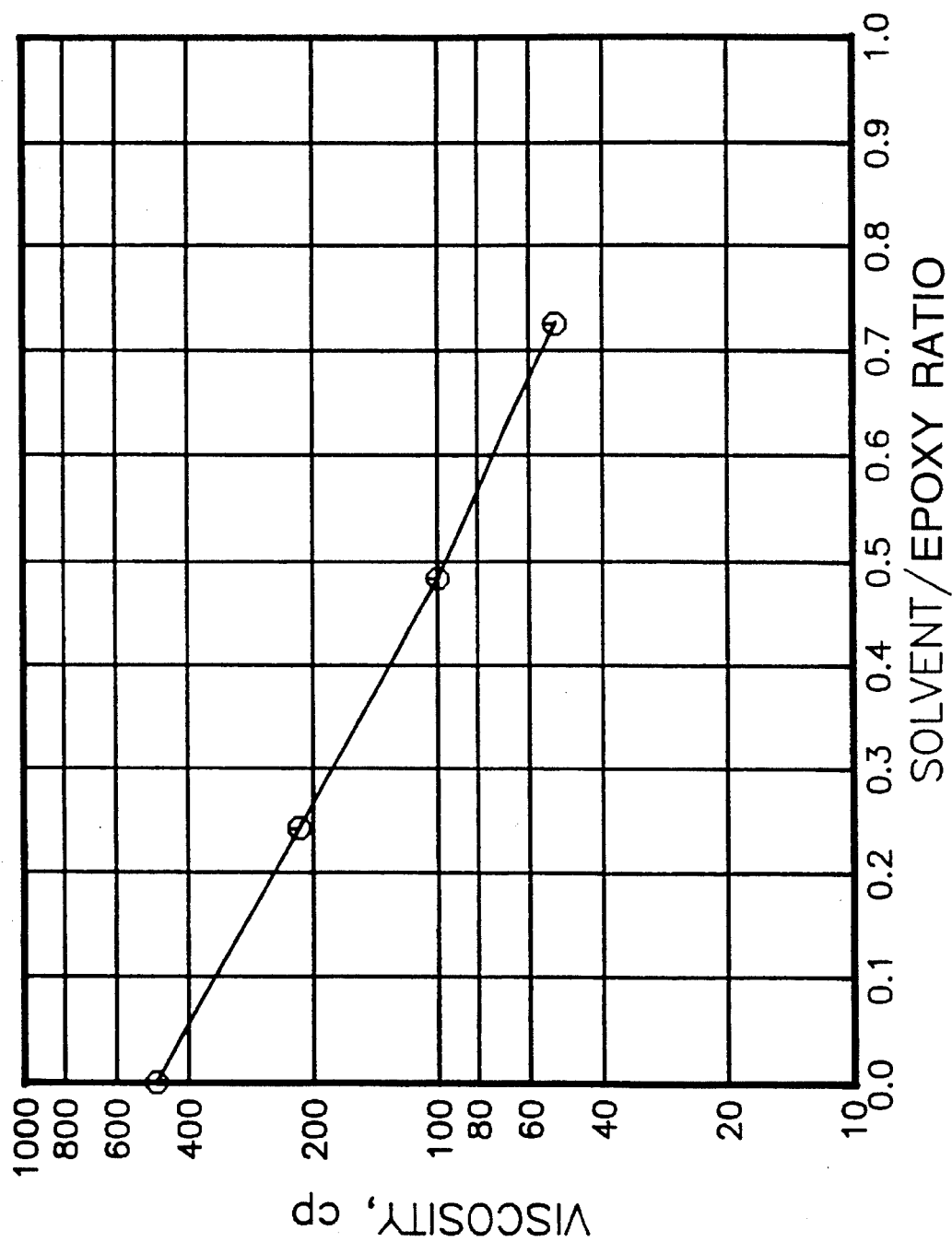
FIG. 1 is a graphic illustration showing the reduction in viscosity of a cement composition utilizing increased amounts of aromatic solvent in accordance with the present invention.

The invention will now be described in the more limited aspects of a preferred embodiment thereof. It will be understood that the disclosure of preferred embodiments is for the purpose of illustration and not limitation.

In treatments to arrest shallow gas migration in colder regions of the world, the temperatures encountered are typically well below 20° C. At these temperatures, normal epoxy-type synthetic cements are extremely thick. A typical formulation of such an epoxy cement has a 300 rpm Frann viscosity reading exceeding 300 cp. Such a fluid is difficult if not impossible to pump and field mixing of the components of the epoxy cement can be disastrous.

It has been found that the addition of an aromatic solvent such as benzene or a substituted benzene such as toluene, xylene and the like can drastically reduce the viscosity of an epoxy-type synthetic cement with the addition of relatively minor amounts of the aromatic solvent. FIG. 1 illustrates the effect on viscosity of an increase in the ratio of solvent to epoxy resin in a synthetic cement system. At a solvent to epoxy resin ratio of 0.72, the viscosity of the cement is 50 cp. This viscosity can be even further reduced if the ratio of solvent is increased. The cement fluid is Newtonian, clear and bright with no free water, sedimentation, settling or non-syneresis. The thickening time of the epoxy resin system including the solvent can be adjusted by adjusting the ratio of the epoxy catalyst and hardener materials. The resultant set cement has excellent compressive strength of more than 8000 psi and is somewhat elastic under stress.

It has been further found that the inclusion of up to about 10% ethylene glycol butyl ether enables the cement in its fluid state to achieve very low interfacial tension with water and zero interfacial tension with in-situ hydrocarbons. This, combined with the low viscosity of the cement, allows the fluid composition to easily and quickly penetrate into microannulae, hair-line cracks and fine capillaries in order to block-off fluid or gas flow migration.

EXAMPLE 1

In order to determine the effects of the solvent on the viscosity and the thickening time of the epoxy synthetic cement of the present invention, varying amounts of xylene solvent containing 10% ethylene glycol butyl ether were added to the epoxy cement mixtures shown in TABLE I with the resultant viscosities, thickening times and compressive strengths as shown.

TABLE I

| Composition | Slurry 1 | Slurry 2 | Slurry 3 |
|---|---|---|---|
| Xylene (w/10% EGBE*), ml | 15 | 30 | 45 |
| Epoxy Resin, ml | 62 | 62 | 62 |
| Hardener, ml | 38 | 38 | 38 |

TABLE I-continued

| Composition | Slurry 1 | Slurry 2 | Slurry 3 |
|---|---|---|---|
| Catalyst, ml | 5 | 10 | 15 |
| Viscosity, cp | 216 | 99 | 52 |
| Thickening Time, Hrs. | 72 | 18 | 6 |
| 60 hr. Compressive Strength. psi | | | 8,000 |

EXAMPLE 2

It was found that a lower viscosity fluid was obtained when the epoxy resin is added last to the mixture of the other fluid components of the composition. It is speculated that this effect is due to a better dispersion of the resin in the mixture of solvent, catalyst and hardener. Additional tests showing the effects of adding the epoxy resin last are shown in TABLE II below.

TABLE 11

| | Slurry 4 | Slurry 5 |
|---|---|---|
| Composition | | |
| Xylene (10% EGBE), ml | 45 | 45 |
| Hardener, ml | 38 | 25 |
| Catalyst, ml | 30 | 30 |
| Epoxy Resin, ml | 62 | 75 |
| Rheology | | |
| 300 rpm | 36 | 41 |
| 200 rpm | 24 | 28 |
| 100 rpm | 12 | 15 |
| 6 rpm | 1 | 2 |
| Thickening Time, Hrs. | 7 | 5 |

*Ethylene Glycol Butyl Ether

The present invention can be used effectively in both remedial cementing procedures wherein a synthetic cement is required to plug minute passages within a previously set cement such as for the prevention of gas migration. The material of the present invention may also be used effectively to stop gas or fluid flow within a rock matrix.

Additionally, the mixture can be used in primary cementing applications both with and without the addition of microsilica filler, particularly in areas having shallow gas formations which present a problem of gas migration to the surface and in other, similar low-temperature primary cementing applications.

While the invention has been described in the more limited aspects of a preferred embodiment thereof, other embodiments have been suggested and still others will occur to those skilled in the art upon a reading and understanding of the foregoing specification. It is intended that all such embodiments be included within the scope of this invention as limited only by the appended claims.

What is claimed is:

1. A method of cementing a well penetrating a subterranean formation comprising the steps of:
   (a) providing a low-temperature, low-rheology cement composition comprising
      (i) an epoxy resin;
      (ii) a resin catalyst;
      (iii) a hardener; and
      (iv) an aromatic solvent in a ratio of 10 to 100% by weight of the epoxy resin; and
   (b) pumping the cement composition under pressure into the well, the well having a casing along its length, their being an annular space between the casing and the wellbore, wherein the cement composition is of a sufficiently low viscosity that it is capable of being pumped into the subterranean formation at temperatures at or below 20 degrees C;
   (c) further wherein the step of pumping comprises pumping the cement composition into an annular space between the casing and the wellbore.

2. The method as set forth in claim 1 wherein:

the well includes a body of hydraulic cement within the casing in the annular space between the casing and the wellbore; further wherein the step of pumping comprises pumping the cement composition under relatively high pressures into the annular space to block fluid migration across the annular space.

* * * * *